United States Patent [19]

Waldron et al.

[11] 4,109,990

[45] Aug. 29, 1978

[54] ELECTRICAL CONNECTOR ASSEMBLY HAVING ANTI-DECOUPLING MECHANISM

[75] Inventors: Clifford Robert Waldron, Unadilla; Carl Lee Knapp, Oneonta, both of N.Y.

[73] Assignee: The Bendix Corporation, Southfield, Mich.

[21] Appl. No.: 800,667

[22] Filed: May 26, 1977

[51] Int. Cl.² .................... F16B 39/32; H01R 13/54

[52] U.S. Cl. .................... 339/89 M; 85/82; 151/13; 339/113 R

[58] Field of Search .................... 339/88-91, 339/113 R; 285/81, 82; 151/9, 11, 13, 8

[56] References Cited

U.S. PATENT DOCUMENTS

| | | | |
|---|---|---|---|
| 3,594,700 | 7/1971 | Nava | 339/91 R X |
| 3,601,764 | 8/1971 | Cameron | 339/91 R X |
| 3,892,458 | 7/1975 | Clark | 339/90 R |

FOREIGN PATENT DOCUMENTS

| | | | |
|---|---|---|---|
| 1,181,236 | 2/1970 | United Kingdom | 285/82 |

*Primary Examiner*—Roy Lake
*Assistant Examiner*—E. F. Desmond
*Attorney, Agent, or Firm*—Kenneth A. Seaman; R. J. Eifler

[57] ABSTRACT

An electrical connector assembly in which the electrical connectors are capable of being quickly and easily coupled and decoupled with mechanism for preventing accidental decoupling of the connector through vibration. The coupling and decoupling is accomplished by a coupling nut mounted on one electrical connector, with the coupling nut having a screw thread adapted to receive a screw thread on a second connector. The connector assembly is adapted to remain coupled to said first housing by a spring mounted to the coupling nut and engaging ratchet teeth carried on an edge of the housing. The ratchet teeth are more steeply angled on the leading edge engaged during decoupling and more gradually angled on the leading edge during coupling, allowing for an ease in coupling and a greater resistance to decoupling.

11 Claims, 6 Drawing Figures

FIG. 1
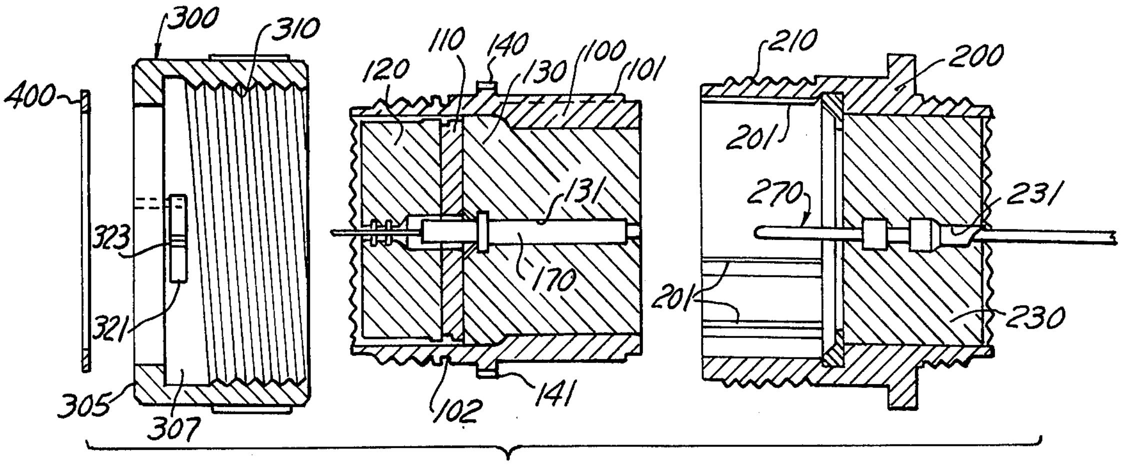
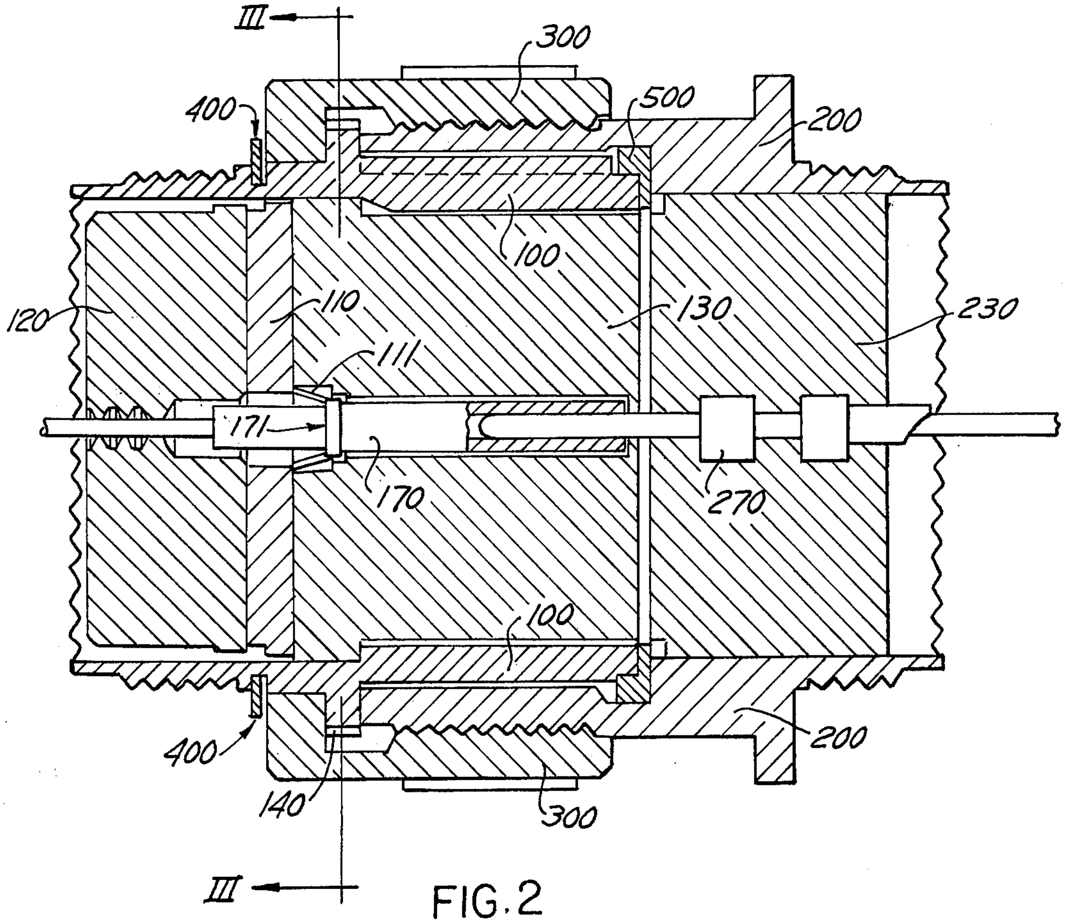
FIG. 2

FIG. 3
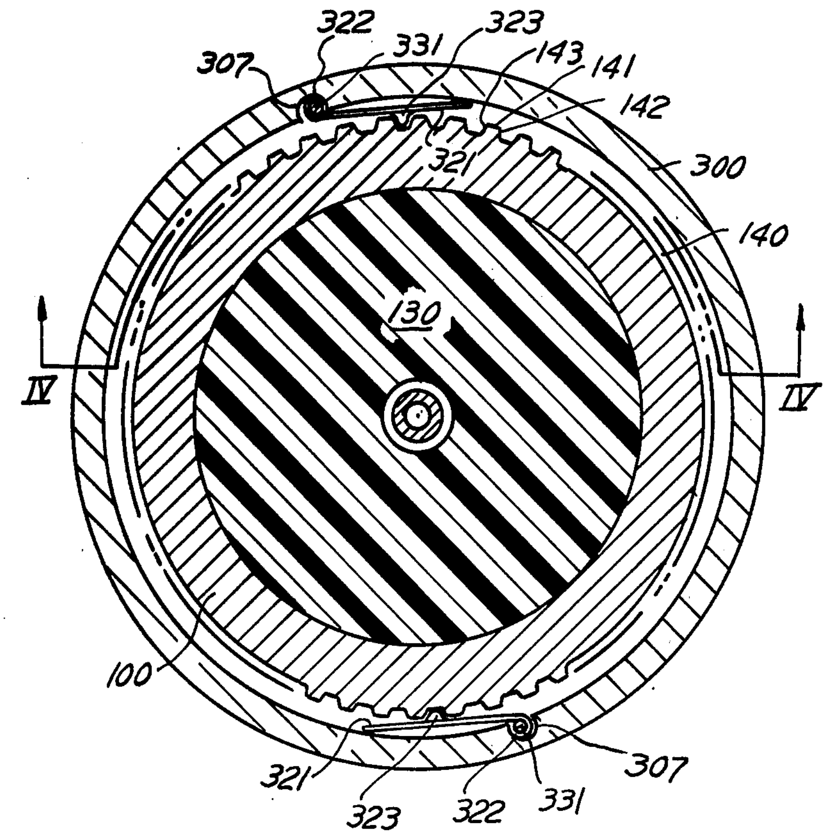
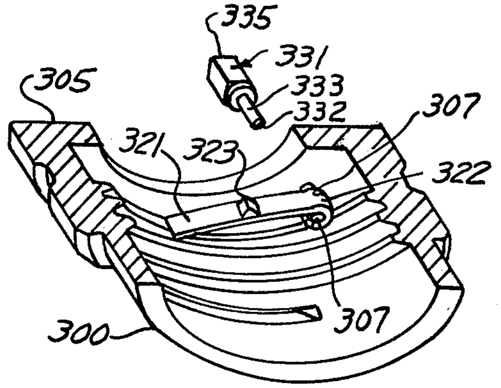
FIG. 4

ELECTRICAL CONNECTOR ASSEMBLY HAVING ANTI-DECOUPLING MECHANISM

BACKGROUND OF THE INVENTION

This invention relates to electrical connector assemblies of the type having coupling nuts for coupling and decoupling an electrical connector assembly. The invention is more particularly related to an improved anti-decoupling mechanism that retains the electrical connector assembly in its coupled state against forces, such as vibration, which would tend to decouple the assembly.

There is a continual need to provide improved electrical connectors to meet the rigid performance standards in the aerospace field. These electrical connectors should be easily and quickly coupled and decoupled with the use of reasonable forces. The connector assemblies, once connected, should remain connected despite vibrational or other forces which might be applied to the connector assembly and which otherwise might tend to uncouple the connectors.

Several prior art patents have addressed themselves to this problem, either directly or indirectly. Thus, the prior art patent to Paole, U.S. Pat. No. 3,971,614, hinders the decoupling of an electrical connector assembly by interlocking splines on the plug shell, on the coupling nut, and on a coupling sleeve which surrounds the coupling nut.

A second prior art attempt to solve this problem is shown in Ennis, U.S. Pat. No. 2,784,385. Here on the coupling member an outer sleeve is provided with a series of exposed teeth and a spring member attached to a fixed flight engages these teeth.

In a third system for preventing the accidental decoupling, U.S. Pat. No. 3,784,966 shows the use of a spring element which engages one of three recesses.

The prior systems for hindering decoupling had the disadvantages of either being unreliable, difficult to make, or prone to failure.

It is a continuing need to provide a system of connecting electrical connector assemblies together to prevent accidental decoupling that is cheap, reliable and easy to make and assemble. The system should be continuous about its periphery, namely in whatever rotational position the respective connectors and coupling nut exist, that the de-coupling assembly function.

SUMMARY OF THE INVENTION

This invention provides a quickly connectable and disconnectable electrical connector assembly that provides an adequate resistance to accidental decoupling, thereby overcoming the limitations of the prior art systems. It is a cheap and reliable system that is easy to make and assemble.

The invention is an electrical connector assembly characterized by a coupling nut 300 carrying a spring element, 321 with a projection 323 which is adapted and positioned to engage a plurality of gear teeth 141 disposed on the periphery of the electrical connector shell 100 to which it is attached. The gear teeth are each provided with a relatively gradual incline on the leading edge during coupling and a relatively steep incline on the leading edge during decoupling. The coupling nut 300 also includes a threaded projection 310 for coupling with the threaded projection on second electrical connector 200 which is mateable with the first electrical connector. The coupling nut retains the first and second electrical connectors in their mated condition and prevents accidental de-coupling, through the gear teeth and spring, which provide relatively large resistance against decoupling forces while providing substantially smaller resistance against coupling forces. Vibration and friction forces thus tend not to de-couple the connected electrical connector assembly.

Accordingly, it is an object of this invention to provide an improved electrical connector that is cheap, reliable, easy to make and assemble which retains coupled electrical connectors and preventing the accidental dis-assembly thereof through vibration.

The above and other objects and features of the present invention will become apparent from the following detailed description, taken in conjunction with the accompanying drawings and claims which form a part of this specification. The use of reference numerals is for the purpose of clarification only and is not intended to limit the invention to the specific structure shown and described.

BRIEF DESCRIPTION OF THE DRAWINGS

FIG. 1 is a cut-away view of the three main portions of an electrical connector assembly.

FIG. 2 is a cut-away view of an electrical connector assembly when connected together.

FIG. 3 is a cross sectional view of the coupling nut and electrical connector taken along the lines III, III shown in FIG. 2.

FIG. 4 is a fragmented view of the coupling nut, seen along the line IV, VI in FIG. 3.

DESCRIPTION OF THE PREFERRED EMBODIMENT

Figure 5:
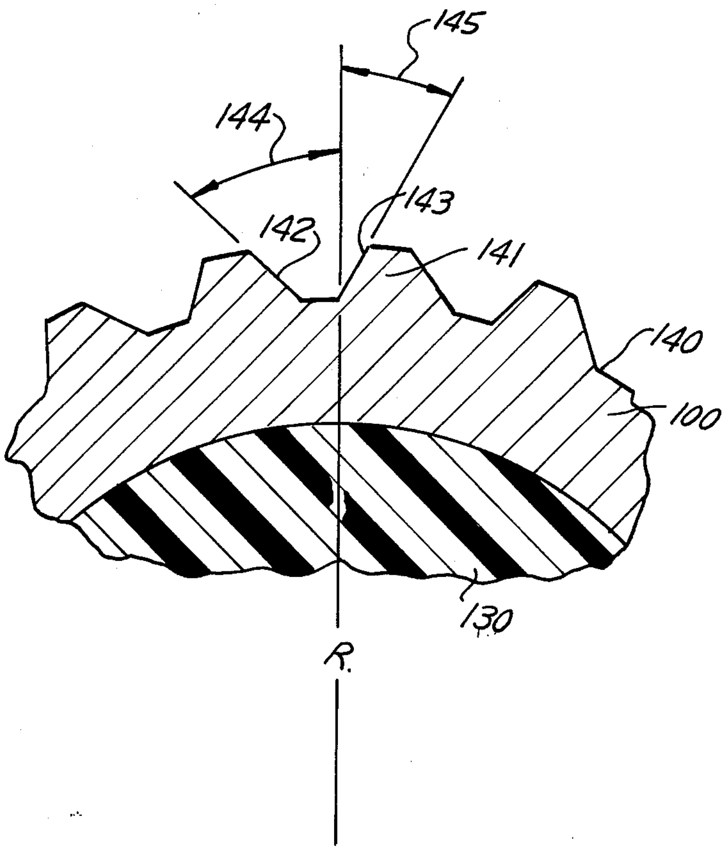
FIG. 5 is an enlarged fragmentary view showing the teeth carried on the flange of one shell.

Referring now to the drawings, FIGS. 1-3 illustrate a cross sectional, exploded view of an electrical connector assembly which incorporates the principles of this invention. An electrical connector assembly comprises a first shell 100, a second shell 200, and a coupling nut 300 mounted to the first shell 100 for connecting the shells 100, 200 together. The typical components of one-half of an electrical connector assembly include a first shell 100 containing one or more female type (socket) electrical contacts 170 retained within the shell 100 by inserts 110, 120, 130. The outside of the first shell 100 generally includes a rear portion that is threaded for receiving a moisture sealing and-or strain relief nut (not shown) and a forward portion that includes one or more axially extending projections or keys 101 for orienting the first shell 100 with a second shell 200.

The second shell 200 contains one or more male type (pin) electrical contacts 270 that mate with the socket contacts 170 of the first shell 100. The pins 270 are retained within the second shell 200 by one or more inserts 230. Alternatively, the male type pin contacts may also be retained in the same manner as the socket type contacts 170 are retained within the first shell 100, that is, with a plurality of inserts. Within the forward portion of the second shell 200, there are one or more axially extending recesses or keyways 201 for engaging the key 101 on the first shell 100. The keys 101 and the keyways 201 are located about the periphery of the shell to locate the first and second shells in their proper rotational positions so that the plurality of male and female contacts engage in a predetermined manner. On the forward portion of the outside of the second shell 200, there are a plurality of threads 210 for receiving threads 310 of the coupling nut 300.

As shown in FIG. 2, the first shell 100 and second shell 200 mate with the threads 210, 310 together, holding pin 270 in socket 170.

The coupling nut 300 is rotatably mounted on the first shell 100 by a snap ring 400, which is snapped into a groove 102 in the first shell 100, thereby captivating the rear portion 305 of the coupling nut 300 between the ring 400 and a flange 140.

As shown in FIG. 3, the flange 140 of the first shell 100 is fitted with a plurality of gear teeth 141.

The coupling nut 300 carries a spring 321 mounted thereto. The spring 321 has a circular end portion 322 for mounting and a projection 323 extending outwardly, that is, away from the coupling nut 300. The projection 323 approximately is a rigid and raised portion along the middle of the length of the spring 321 and is the only portion of the spring 321 to engage the teeth 141 carried on the flange 140.

As shown in FIG. 4, the spring 321 is mounted to the coupling nut 300 in an undercut or recess 307 of the coupling nut 300. A pin 331 retains the circular end portion 322 of the spring 321 within the recess 307. The pin 331 is inserted from the rear portion 305 of the coupling nut 300 through a hole.

The spring must advantageously be held firmly to the coupling nut 300 to prevent unwanted movement and possibly early failure. This must be accomplished while maintaining ease in assembly. For ease in assembly, the recess 307 is made larger than the circular end portion 322 of the spring 321. The pin 331 if formed with a tapered portion 332 on its leading or forward edge during assembly, a cylindrical portion 333 medially and a square head portion 335 on its ceiling or rear portion during assembly. The cylindrical portion 333 has a diameter that is slightly larger than the inside diameter of the circular end portion 322 of the spring 321. The tapered portion and the slightly larger diameter of the cylindrical portion 333 urges the circular end portion 322 of the spring to expand during assembly, causing a tight fit between the circular end portion 322 of the spring 321 and the cylindrical portion 333. The square head 335 of the pin 331 is pressed into a round hole in the coupling nut 300. The round hole and the square head 335 have carefully chosen dimensions to provide a tight fit. As a result, the pin 331 is firmly fixed to the coupling nut 300 and the spring 321 is firmly fixed to the pin 331 by the fit of the cylindrical portion 333 of the pin 331 within the circular end portion 322 of the spring 321.

For stability, reliability, and better performance, a plurality of springs 321 are mounted to the coupling nut 300 in a symmetrical arrangement. Two springs 321 are preferred for economy, but more could be used.

As shown in FIG. 5, each gear tooth 141 is not symmetrical, but rather has a gradual incline on one edge 142 and a steeper incline on the other edge 143. The edge 142 with the gradual incline is the leading edge coupling, that is, the shell 100 would rotate clockwise for coupling or greater engagement with the second shell. During coupling there would be relatively small resistance to rotation.

The edge 143 with the steeper incline is the leading edge during decoupling. It presents greater resistance to rotation.

Typically, the edge 142 is cut at a 45° angle (shown as 144) and the edge 143 is cut at a 30° angle (shown as 145).

Since the plug shell 100 is an extruded part in its preferred embodiment and the coupling nut 300 is not extruded, the gear teeth 141 are rather inexpensive to form on the periphery of it, that is, on flange 140. If desired, the gear teeth could be associated with the coupling nut, either by machining or by an insert attached thereto. Such an arrangement would require the spring 321 to be associated with the shell 100.

Instead of providing a differential incline on the edges of the teeth 141, this could be accomplished by a differential incline in the projection 323 carried on spring 321 or on both.

Figure 6:
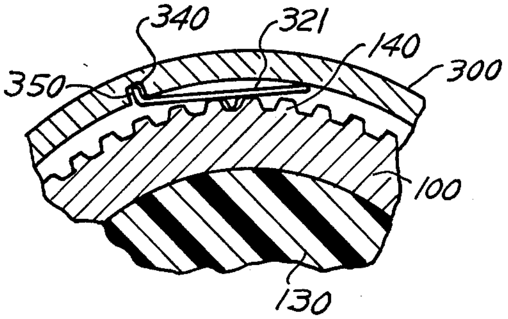
FIG. 6 is an alternate embodiment, showing a portion of the coupling nut with spring and gear teeth.

Another alternative embodiment is shown in FIG 6. The spring 321 has a bent end 340 in place of the circular portion shown in FIGS. 3 and 4. The bent end 340 fits into a small hole 350 which extends partially through the coupling nut 300. This embodiment has the advantage of a lower cost to manufacture, but has a disadvantage in terms of lower reliability.

While a preferred embodiment of the invention has been disclosed, it will be apparent to those skilled in the art that changes may be made to the invention as set forth in the appended claims and, in some instances, certain features of the invention may be used to advantage without corresponding use of other features. Other spring assemblies, such as a coil spring with a suitable tip for engaging the teeth would suffice. Accordingly, it is intended that the illustrative and descriptive materials herein be used to illustrate the principles of the invention and not to limit the scope thereof.

Having thus described the invention, what is claimed is:

1. An electrical connector assembly comprising:
- a first shell having an insert with a plurality of axial passages;
- a second shell having an insert with a plurality of axial passages, said second shell having thread means of a portion of the outside of said second shell;
- a plurality of pin-type electrical contacts, each mounted in a respective axial passage of one of said inserts;
- a plurality of socket-type electrical contacts, each mounted in a respective axial passage of the other of said inserts, said socket-type electrical contacts arranged in the other insert in the same manner as the pin-type electrical contacts are arranged in the first insert and mateable with said pin-type electrical contacts;
- a coupling nut for selectively connecting and maintaining said first and second shells together and holding said pin-type and socket-type electrical contacts together in a mated position, said coupling nut mounted for rotational movement on said first shell with thread means connectable with the thread means on the second shell for connecting the first and second shells together with the pin-type and socket-type electrical contacts held in mated relationship; and
- means for retarding the rotational movement for the coupling nut in one direction relative to the first and second shells, said retarding comprising:
- a leaf spring assembly mounted to the coupling nut, said assembly including an enlarged portion that extends inwardly in a radial direction from the coupling nut toward the shells;

an annular shoulder mounted on one of the shells and extending radially outwardly from the one shell toward the coupling nut, said annular shoulder provided with teeth on the outside surface thereof and extending radially inwardly therefrom each of said teeth having a first and second sides, one of said sides inclined at a greated angle than the other side, said spring element and said teeth positioned relative to each other so as to engage a portion of said spring element within the notched recesses to retard rotational movement in one rotational direction compared to rotational movement in the other rotational direction.

2. An electrical connector as recited in claim 1 wherein said coiled end portion of the spring is secured to the coupling nut by a pin inserted from the exterior of the coupling nut through an aperture therein, said pin for retaining the end portion of the spring in a predetermined location within the coupling nut.

3. An electrical connector as recited in claim 2 wherein the pin has a square rear portion and the aperture in the coupling nut is a circular hole, with the size of said square rear portion and said hole are chosen to provide a tight fit upon insertion of said square portion into said circular hole.

4. An electrical connector as recited in claim 2 wherein said portion of the spring assembly includes a projection located medially along its length extending radially inwardly for yieldably engaging the teeth.

5. An electrical connector as recited in claim 4 wherein the projection is located medially along the length of the spring.

6. An electrical connector assembly comprising:

a first shell having an insert with a plurality of axial passages;

a second shell having an insert with a plurality of axial passages, said second shell having thread means on a portion of the outside of said second shell;

a plurality of pin-type electrical contacts, each mounted in a respective axial passage of one of said inserts;

a plurality of socket-type electrical contacts, each mounted in a respective axial passage of the other of said inserts, said socket-type electrical contacts arranged in the other insert in the same manner as the pin-type electrical contacts are arranged in the first insert and mateable with said pin-type electrical contacts;

a coupling nut for selectively connecting and maintaining said first and second shells together and holding said pin-type and socket-type electrical contacts together in a mated position, said coupling nut mounted for rotational movement on said first shell with thread means connectable with the thread means on the second shell for connecting the first and second shells together with the pin-type and socket-type electrical contacts held in mated relationship; and means for retarding the rotational movement of the coupling nut relative to the first and second shells, retarded in one rotational direction as compared to the rotational movement of said nut in an opposite rotational direction, said retarding means comprising:

an annular shoulder mounted on one of the first shells and the coupling nut, said shoulder extending radially toward the other of said first shell and the coupling nut, said annular shoulder provided with teeth on the outside surface thereof and extending radially therefrom; and an assembly mounted to other of the coupling nut and the first shell, said assembly including a yieldable portion biased in a radial direction toward the one of said first shell and said coupling nut, with one of said yieldable portion and said teeth on said annular shoulder having a first side and a second side, with said first side having a steeper incline than said second side, whereby rotational movement of the coupling nut relative to said shells is retarded in the direction of the steeper first side compared to rotational movement in the direction of the second side.

7. An electrical connector as recited in claim 6 wherein said yieldable portion is a leaf spring.

8. An electrical connector as recited in claim 6 wherein said yieldable portion has a coiled end portion, and said coiled end portion is secured to the other of said first shell and said coupling nut.

9. An electrical connector as recited in claim 8 wherein said coiled end portion of the yieldable portion is secured to the other of said first shell and said coupling nut by a pin inserted from the exterior thereof through an aperture therein, said pin for retaining the assembly and yieldable portion with respect to said connector assembly.

10. An electrical connector as recited in claim 9 wherein the pin has a square rear portion and the aperture is a circular hole, with the size said square rear portion and said hole are chosen to provide a tight fit upon insertion of said square portion into said circular hole.

11. An electrical connector as recited in claim 9 wherein said portion of the yieldable portion includes an enlarged portion located medially along its length extending toward said annular shoulder for yieldably engaging the teeth.

* * * * *